(12) United States Patent
Chen et al.

(10) Patent No.: US 11,603,161 B2
(45) Date of Patent: Mar. 14, 2023

(54) BICYCLE CALIPER

(71) Applicant: TEKTRO TECHNOLOGY CORPORATION, Changhua County (TW)

(72) Inventors: Chao-Kung Chen, Changhua County (TW); Po-Chien Tsai, Changhua County (TW)

(73) Assignee: TEKTRO TECHNOLOGY CORPORATION, Changhua County (TW)

( * ) Notice: Subject to any disclaimer, the term of this patent is extended or adjusted under 35 U.S.C. 154(b) by 239 days.

(21) Appl. No.: 17/090,006

(22) Filed: Nov. 5, 2020

(65) Prior Publication Data
US 2021/0147033 A1 May 20, 2021

(30) Foreign Application Priority Data

Nov. 20, 2019 (TW) .................................. 108142163

(51) Int. Cl.
| | |
|---|---|
| *F16D 55/228* | (2006.01) |
| *B62K 23/06* | (2006.01) |
| *B62L 1/00* | (2006.01) |
| *B62L 3/02* | (2006.01) |
| *F16D 65/00* | (2006.01) |

(Continued)

(52) U.S. Cl.
CPC ............. *B62K 23/06* (2013.01); *B62L 1/005* (2013.01); *B62L 1/02* (2013.01); *B62L 3/023* (2013.01); *F16D 55/228* (2013.01); *F16D 65/0018* (2013.01); *F16D 65/0068* (2013.01); *F16D 2055/0016* (2013.01)

(58) Field of Classification Search
CPC ............... F16D 55/228; F16D 65/0018; F16D 65/0068; F16D 2055/0016; B62L 1/005; B62L 1/02; B62L 3/023; B62K 23/06
See application file for complete search history.

(56) References Cited

U.S. PATENT DOCUMENTS

| | | | |
|---|---|---|---|
| 3,400,789 A * | 9/1968 | Mione .................... | F16D 65/092 188/264 AA |
| 4,754,856 A * | 7/1988 | Villata ................... | F16D 55/228 92/169.1 |

(Continued)

*Primary Examiner* — Xuan Lan Nguyen
(74) *Attorney, Agent, or Firm* — Locke Lord LLP; Tim Tingkang Xia, Esq.

(57) ABSTRACT

The disclosure provides a bicycle caliper including a casing assembly and a plurality of pistons. The casing assembly has a first fluid inlet, a second fluid inlet, a first fluid channel, a plurality of piston chambers, and a second fluid channel. The first fluid channel has a first connection opening and a second connection opening opposite to each other. The first connection opening and the second connection opening of the first fluid channel are respectively in fluid communication with the first fluid inlet and the second fluid inlet. The first fluid channel penetrates through the piston chambers. Two opposite openings of the second fluid channel are respectively in fluid communication with the first connection opening and the second connection opening of the first fluid channel, and the second fluid channel does not penetrate through the piston chambers. The pistons are respectively and movably disposed in the piston chambers.

17 Claims, 7 Drawing Sheets

(51) Int. Cl.
   *B62L 1/02* (2006.01)
   *F16D 55/00* (2006.01)

(56) References Cited

U.S. PATENT DOCUMENTS

| | | | | |
|---|---|---|---|---|
| 5,515,948 | A * | 5/1996 | Gilliland | F16D 55/228 188/72.5 |
| 8,261,889 | B2 * | 9/2012 | Itsuaki | F16D 55/228 188/72.4 |
| 9,193,413 | B1 * | 11/2015 | Nago | B62L 1/00 |
| 9,551,389 | B2 * | 1/2017 | Hirotomi | F16D 65/18 |

* cited by examiner

BICYCLE CALIPER

CROSS-REFERENCE TO RELATED APPLICATIONS

This non-provisional application claims priority under 35 U.S.C. § 119(a) on Patent Application No(s). 108142163 filed in Taiwan, R.O.C. on Nov. 20, 2019, the entire contents of which are hereby incorporated by reference.

TECHNICAL FIELD

The disclosure relates to a caliper, more particularly to a bicycle caliper.

BACKGROUND

In recent years, road bikes, mountain bikes and other types of bikes become more and more popular so that the manufacturers pay more attention on developing new and market-oriented products in order to provide costumers a better riding experience and a more stylish appearance of bicycle.

Most of bike brake systems are hydraulic, when braking, the pressure forces the fluid to move into the caliper, pistons housed in the caliper will press the brake pads against the brake disk, resulting friction to stop or slow the wheel spinning. However, due to the fluid channels arrangement in the conventional calipers, the pistons will not be activated simultaneously, such that the pistons are not evenly forced by the fluid, decreasing the braking performance. In addition, the outer casing of the conventional caliper is assembled from two shells, fluid leakage often occurs at the interface of these two shells. Therefore, the developers are constantly working on improving the bike calipers.

SUMMARY OF THE INVENTION

The disclosure provides a bicycle caliper that has an improved braking performance and can prevent leakage.

One embodiment of the disclosure provides a bicycle caliper. The bicycle caliper includes a casing assembly and a plurality of pistons. The casing assembly has a first fluid inlet, a second fluid inlet, a first fluid channel, a plurality of piston chambers, and a second fluid channel. The first fluid channel has a first connection opening and a second connection opening opposite to each other. The first connection opening and the second connection opening of the first fluid channel are respectively in fluid communication with the first fluid inlet and the second fluid inlet. The first fluid channel penetrates through the piston chambers. Two opposite openings of the second fluid channel are respectively in fluid communication with the first connection opening and the second connection opening of the first fluid channel, and the second fluid channel does not penetrate through the piston chambers. The pistons are respectively and movably disposed in the piston chambers.

Another embodiment of the disclosure provides a bicycle caliper. The bicycle caliper includes a casing assembly and at least two sealing rings. The casing assembly includes a first casing body, a second casing body, and a first fastener. The first casing body has a first mount hole, and the second casing body has a first through hole. The first casing body are assembled with the second casing body, and the first through hole is in fluid communication with the first mount hole. The first fastener includes a first body portion, the first body portion is disposed through the first through hole and fixed in the first mount hole. The first body portion has a first axial channel, and the first axial channel is in fluid communication with the first mount hole.

According to the bicycle calipers as discussed above, the first channel and the second channel of the first fluid channel of the casing assembly respectively penetrate through the piston chambers and, and the second fluid channel are in fluid communication with the first connection opening and the second connection opening of the first fluid channel and does not penetrating through the piston chambers, such that the oil flowing through the second fluid channel can flow into the first fluid channel from the first connection opening and the second connection opening of the first fluid channel to force the pistons to move. Therefore, the time differences among the pistons that begin to move can be reduced down to an acceptable range, such that the time that the pistons are evenly forced by the oil can be reduced, thereby improving the braking performance of the caliper.

In addition, the sealing rings sleeved on the first body portion of the first fastener and respectively located at the first mount hole of the first casing body and the first through hole of the second casing body can prevent oil from linking from the place where the first mount portion and the third mount portion are contact with each other, thereby improving the fluid tightness of the caliper.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

Figure 1:
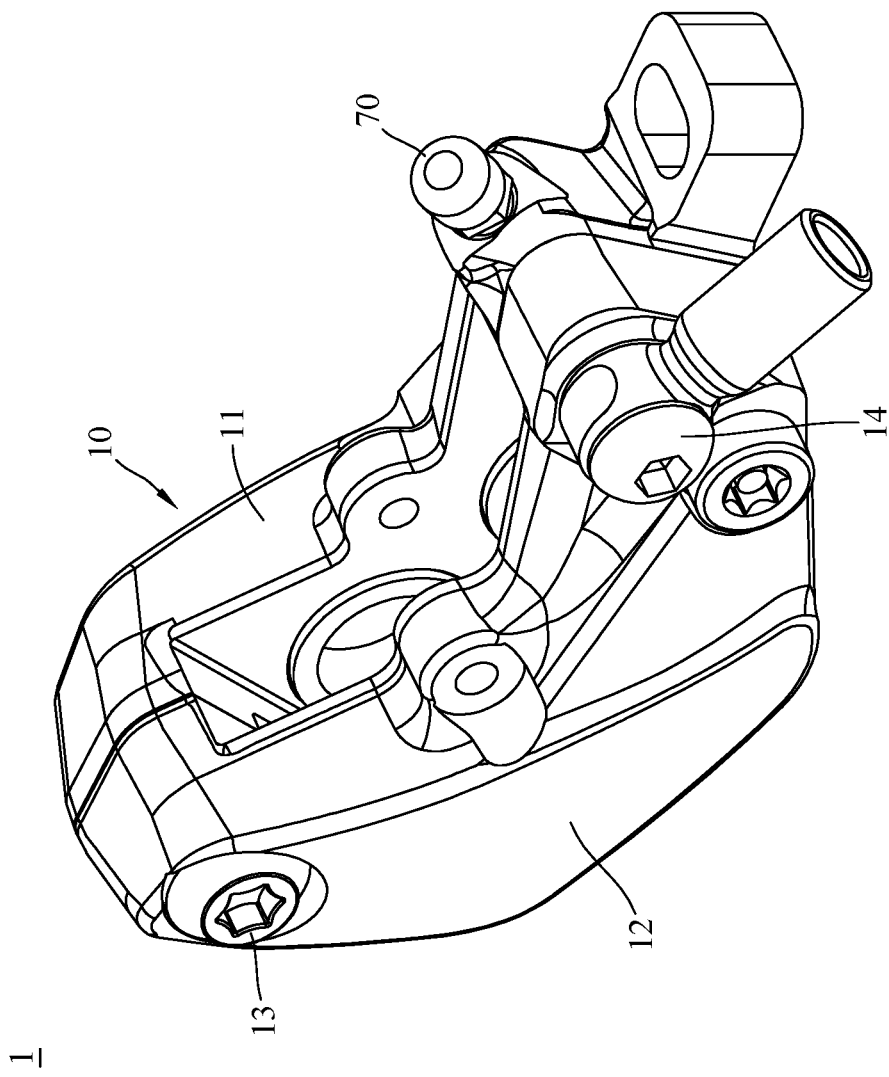
FIG. 1 is a perspective view of a bicycle caliper according to a first embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure.

In this disclosure, the fluid communication between an inlet and a channel, or two channels and so on means that fluid can flow therebetween. In addition, in this disclosure, an opening of a channel may be also referred as an end of the channel that connects with another channel.

Figure 2:
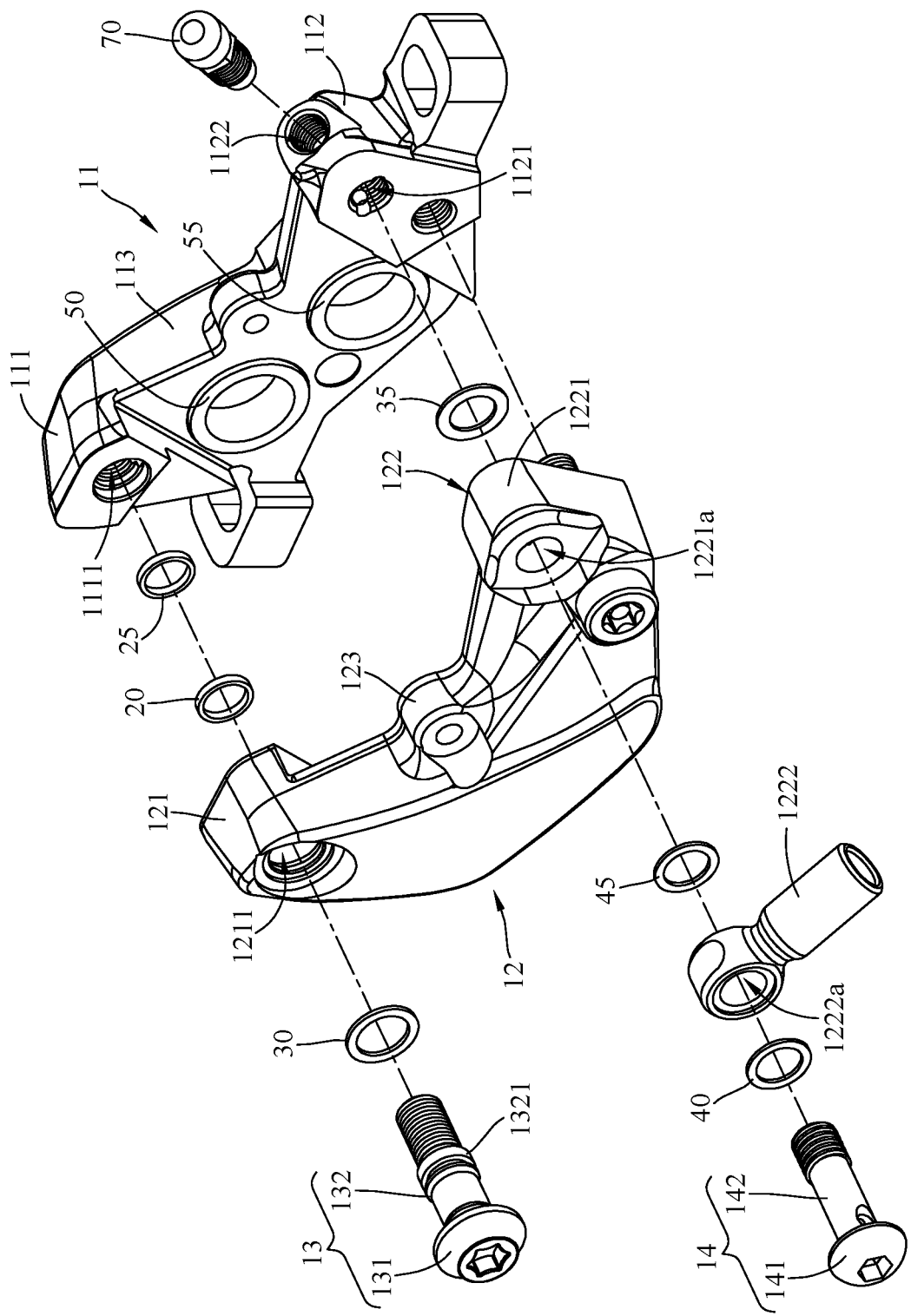
FIG. 2 is an exploded view of the bicycle caliper in FIG. 2.
Figure 3:
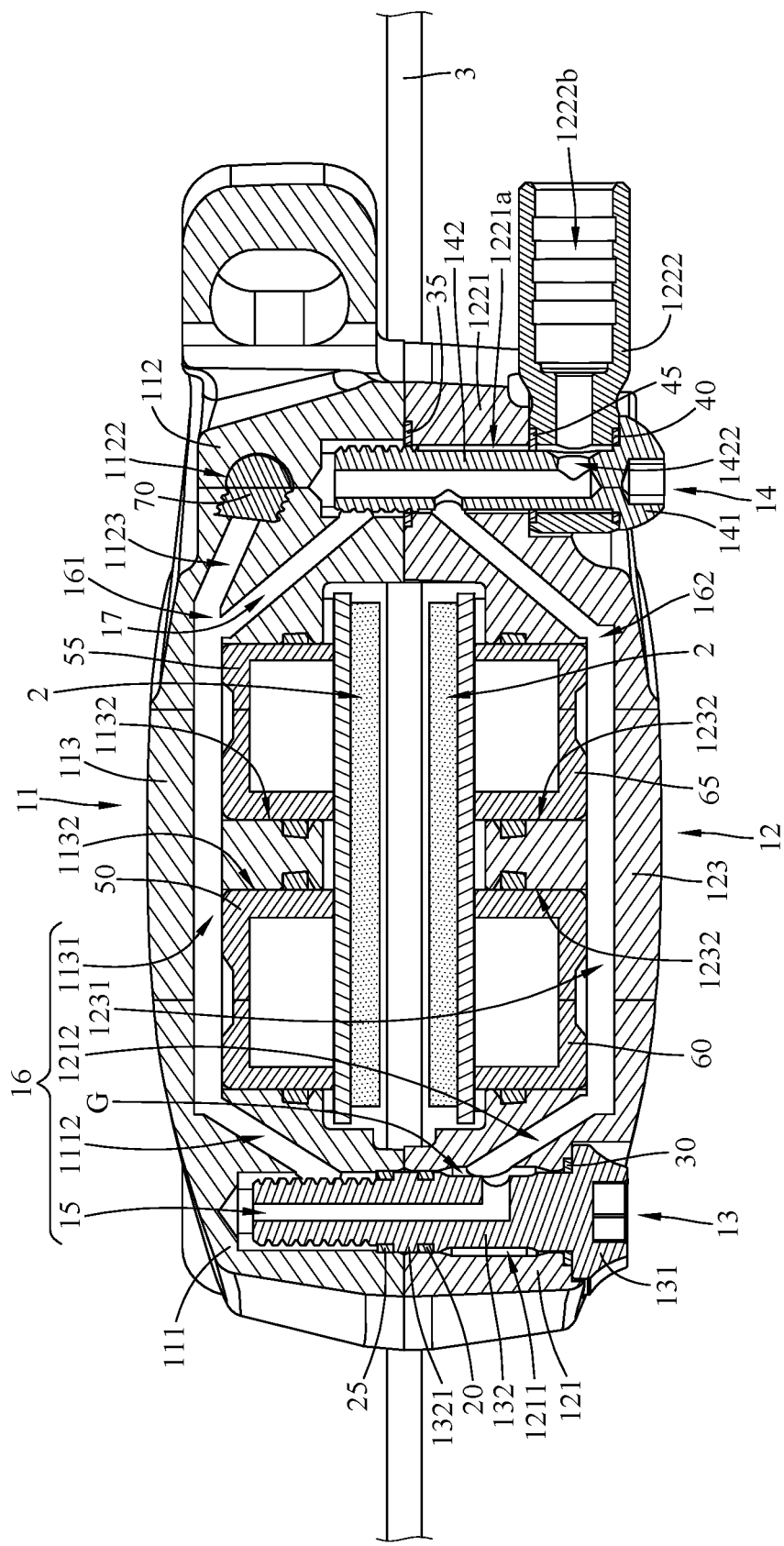
FIG. 3 is a cross-sectional view of the bicycle caliper in FIG. 1.

Referring to FIGS. 1 to 3, there are shown a perspective view of a bicycle caliper 1 according to a first embodiment of the disclosure, an exploded view of the bicycle caliper 1 in FIG. 2, and a cross-sectional view of the bicycle caliper 1 in FIG. 1.

In this embodiment, the bicycle caliper includes a casing assembly 10, a plurality of sealing rings 20, 25, 30, 35, 40, and 45, and a plurality of pistons 50, 55, 60, and 65.

Figure 4:
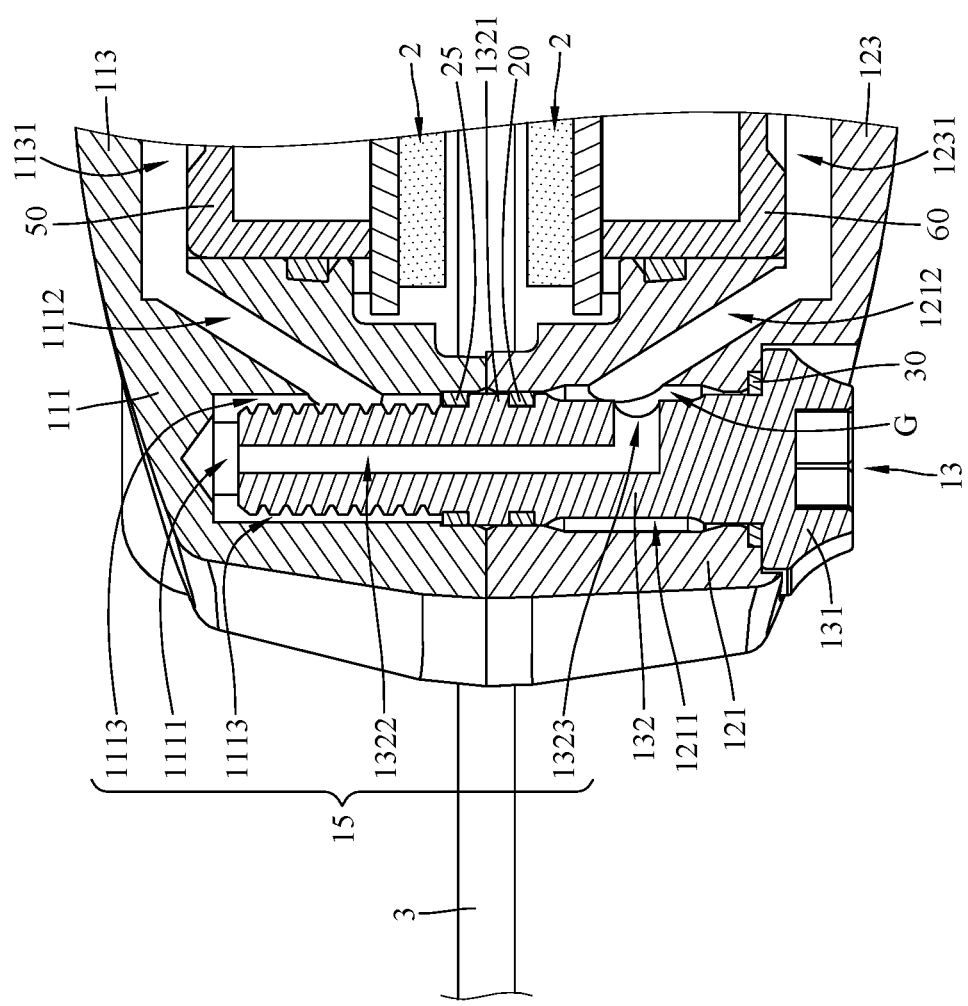
FIG. 4 is a partial and enlarged cross-sectional view of the bicycle caliper in FIG. 3.
Figure 5:
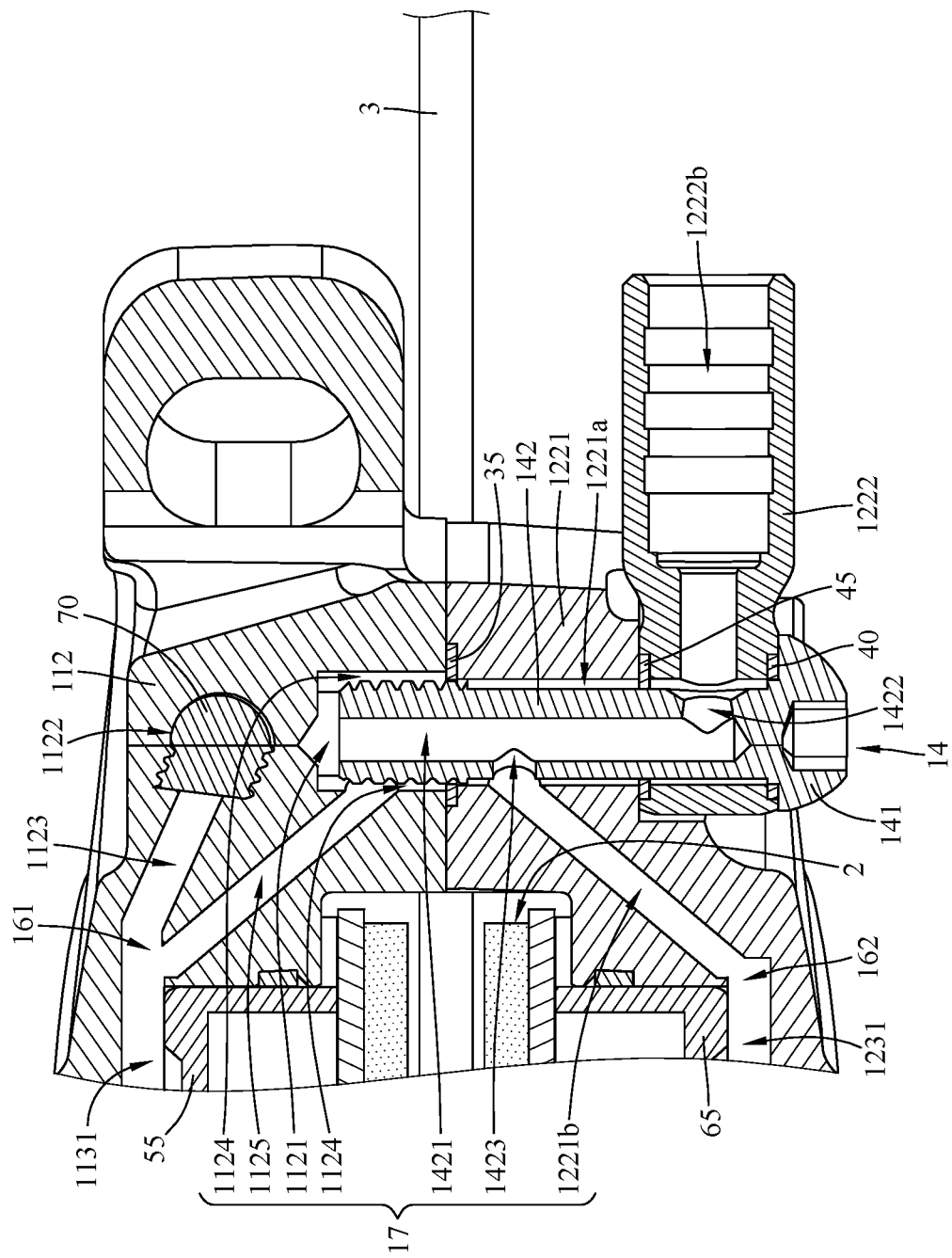
FIG. 5 is another partial and enlarged cross-sectional view of the bicycle caliper in FIG. 3.

Further referring to FIGS. 4 and 5, there are shown a partial and enlarged cross-sectional view of the bicycle caliper 1 in FIG. 3 and another partial and enlarged cross-sectional view of the bicycle caliper 1 in FIG. 3.

As shown, the casing assembly 10 includes a first casing body 11, a second casing body 12, a first fastener 13, and a second fastener 14. The first casing body 11 includes a first mount portion 111, a second mount portion 112, and a first piston accommodation portion 113. The first piston accommodation portion 113 is located between and connected to the first mount portion 111 and the second mount portion 112. The second casing body 12 includes a third mount portion 121, a fourth mount portion 122, and a second piston accommodation portion 123. The fourth mount portion 122 includes a casing part 1221 and a pipe connection part 1222. The second piston accommodation portion 123 is located between and connected to the third mount portion 121 and the casing part 1221 of the fourth mount portion 122. The first mount portion 111 has a first mount hole 1111. The second mount portion 112 has a second mount hole 1121. The third mount portion 121 has a first through hole 1211. The casing part 1221 of the fourth mount portion 122 has a second through hole 1221a. The pipe connection part 1222 has an insertion hole 1222a.

The first fastener 13 and the second fastener 14 are, for example, bolts or studs. The first fastener 13 includes a first head portion 131 and a first body portion 132 connected to each other. The second fastener 14 includes a second head portion 141 and a second body part 142 connected to each other. The first body portion 132 of the first fastener 13 is disposed through the first through hole 1211 and fixed in the first mount hole 1111, and the first head portion 131 is located outside the first through hole 1211. The second body part 142 of the second fastener 14 is disposed through the insertion hole 1222a and the second through hole 1221a and fixed in the second mount hole 1121, and the second head portion 141 is located outside the second through hole 1221a and the insertion hole 1222a.

In this embodiment, the pipe connection part 1222 is an independent piece fixed to the casing part 1221, but the present disclosure is not limited thereto; in some other embodiments, the pipe connection part may be integrally formed with the casing part.

The sealing rings 20 and 25 are sleeved on the first body portion 132 of the first fastener 13, and respectively located at the first mount hole 1111 and the first through hole 1211. The first body portion 132 has a flange 1321 radially protruding outwards. The flange 1321 is located between the sealing rings 20 and 25, and located at a place where the first mount portion 111 and the third mount portion 121 are contact with each other. The sealing ring 30 is located between and clamped by the first head portion 131 of the first fastener 13 and the third mount portion 121 of the second casing body 12. The sealing ring 35 is located between and clamped by the second mount portion 112 of the first casing body 11 and the casing part 1221 of the fourth mount portion 122. The sealing ring 40 is located between and clamped by the second head portion 141 of the second fastener 14 and the pipe connection part 1222 of the fourth mount portion 122, and the sealing ring 45 is located between and clamped by the pipe connection part 1222 and the casing part 1221 of the fourth mount portion 122.

The second mount portion 112 of the first casing body 11 further has a first fluid inlet 1122 and an inlet channel 1123 having an opening in fluid communication with the first fluid inlet 1122. The first piston accommodation portion 113 of the first casing body 11 has a first channel 1131 and two piston chambers 1132. The first channel 1131 penetrates through the piston chambers 1132, and the other opening of the inlet channel 1123 is in fluid communication with the first channel 1131. The first mount portion 111 of the first casing body 11 further has a connection channel 1112 and two first lateral grooves 1113. The first lateral grooves 1113 are located at the inner surface of the first casing body that surrounds the first mount hole 1111, and two opposite openings of the connection channel 1112 are respectively in fluid communication with an opening of the first channel 1131 located away from the inlet channel 1123 and one of the first lateral grooves 1113. The first body portion 132 of the first fastener 13 has a first axial channel 1322 and a first radial channel 1323 respectively extending in axial and radial directions. Two opposite openings of the first axial channel 1322 are respectively in fluid communication with the first mount hole 1111 and the first radial channel 1323. The third mount portion 121 further has a connection channel 1212. In this embodiment, at least part of the first through hole 1211 is wider than the first body portion 132 of the first fastener 13, such that a gap G is formed between the first body portion 132 and an inner surface of the second casing body 12 that surrounds the first through hole 1211. The first radial channel 1323 is in fluid communication with the connection channel 1212 via the gap G. The second piston accommodation portion 123 of the second casing body 12 has a second channel 1231 and two piston chambers 1232, and the second channel 1231 penetrates through the piston chambers 1232. An opening of the connection channel 1212 located away from the gap G is in fluid communication with the second channel 1231.

The pistons 50 and 55 are respectively and movably disposed at the piston chambers 1132. The pistons 60 and 65 are respectively and movably disposed at the piston chambers 1232. The pistons 50, 55, 60, and 65 are configured to push two brake pads 2 to clamp a brake disk 3 disposed on a bicycle wheel (not shown) when braking.

Note that the quantity of the piston chambers 1132 of the first piston accommodation portion 113 is not restricted to be two; in some other embodiments, the first piston accommodation portion may have only one piston chamber. Similarly, in some other embodiments, the second piston accommodation portion may also have only one piston chamber. In such a configuration, the bicycle caliper may include only two pistons respectively disposed at the piston chamber of the first piston accommodation portion and the piston chamber of the second piston accommodation portion.

In this embodiment, the first lateral groove 1113, the first mount hole 1111, the first axial channel 1322, and the first radial channel 1323 together form a third channel 15, and the first channel 1131, the connection channel 1112, the third channel 15, the gap G, the connection channel 1212, and the second channel 1231 together form a first fluid channel 16. In other words, in this embodiment, the third channel 15 includes the first lateral groove 1113, the first mount hole 1111, the first axial channel 1322, and the first radial channel 1323, and the first fluid channel 16 includes the first channel 1131, the connection channel 1112, the third channel 15, the gap G, the connection channel 1212, and the second channel 1231. The first fluid channel 16 has a first connection opening 161 and a second connection opening 162 opposite to each other. The first connection opening 161 is located at a place where the first channel 1131 is connected to the inlet channel 1123, and the first connection opening 161 of the first fluid channel 16 is in fluid communication with the first fluid inlet 1122 via the inlet channel 1123, and the second connection opening 162 is located at an opening of the second channel 1231 located away from the connection channel 1212.

Furthermore, the second body part 142 of the second fastener 14 has a second axial channel 1421, a second radial channel 1422, and an opening 1423 that are in fluid communication with one another. The second axial channel 1421 and the second radial channel 1422 respectively extend in axial and radial directions, and the opening 1423 is located at an inner surface of the second body part 142. An opening of the second axial channel 1421 of the second body part 142 located away from the second radial channel 1422 is in fluid communication with the second mount hole 1121.

In this embodiment, the pipe connection part 1222 further has a second fluid inlet 1222b, and the second fluid inlet 1222b is in fluid communication with the second radial channel 1422. The casing part 1221 of the fourth mount portion 122 of the second casing body 12 further has a connection channel 1221b, and two opposite ends of the connection channel 1221b are respectively in fluid communication with the second connection opening 162 of the first fluid channel 16 and the opening 1423. As such, the second connection opening 162 of the first fluid channel 16 is in fluid communication with the second fluid inlet 1222b via the opening 1423, the second axial channel 1421, and the second radial channel 1422.

In this embodiment, the second mount portion 112 of the first casing body 11 further has two second lateral grooves 1124 and a connection channel 1125, and the second lateral grooves 1124 are located at an inner surface of the first casing body 11 that surrounds the second mount hole 1121. An opening of the connection channel 1125 is in direct fluid communication with the first connection opening 161 of the first fluid channel 16, and the other opening of the connection channel 1125 is in fluid communication with the second connection opening 162 of the first fluid channel 16 via the second lateral groove 1124, the second mount hole 1121, the second axial channel 1421, the opening 1423, and the connection channel 1221b. The connection channel 1125, the second lateral groove 1124, the second mount hole 1121, a part of the second axial channel 1421, the opening 1423, and the connection channel 1221b together form a second fluid channel 17. In other words, the second fluid channel 17 includes the connection channel 1125, the second lateral groove 1124, the second mount hole 1121, a part of the second axial channel 1421, the opening 1423, and the connection channel 1221b. As such, two opposite openings of the second fluid channel 17 are respectively in fluid communication with the first connection opening 161 and the second connection opening 162 of the first fluid channel 16, and the second fluid channel 17 does not penetrate the piston chambers 1132 and 1232.

In this embodiment, the bicycle caliper 1 may further include a bolt 70. The bolt 70 can be screwed into the first fluid inlet 1122 of the first casing body 11 to seals the first fluid inlet 1122. In addition, an oil pipe (not shown) may be used to connect the pipe connection part 1222 with a bicycle brake lever (not shown), such that the second fluid inlet 1222b of the pipe connection part 1222 are in fluid communication with the bicycle brake lever. The oil can be filled into the bicycle caliper 1 via the first fluid inlet 1122 when the bolt 70 is removed.

Figure 6:
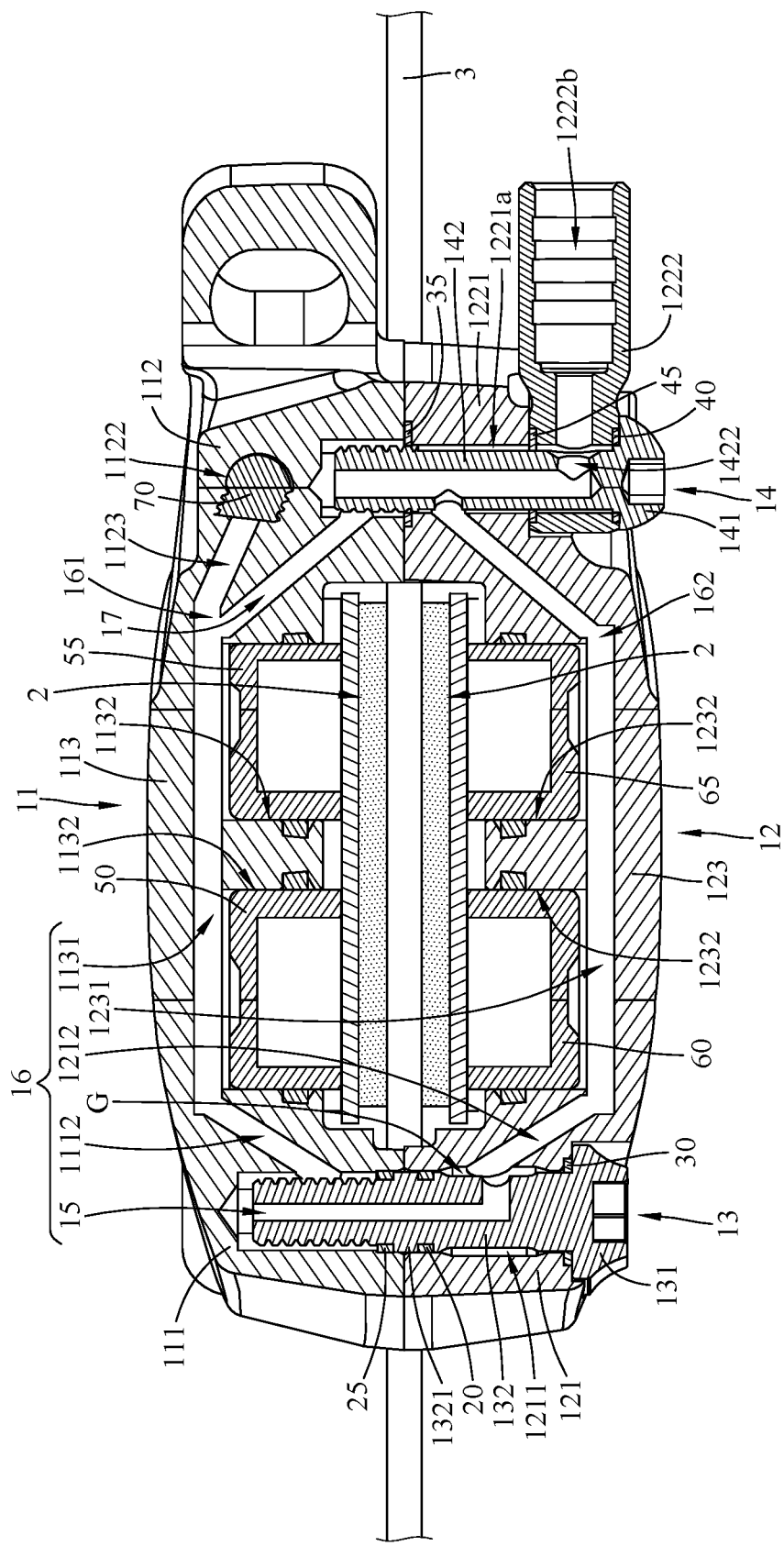
FIG. 6 is a cross-sectional view showing that pistons of the bicycle caliper push brake pads.

Then, further referring to FIG. 6 with FIGS. 4 and 5, there is shown a cross-sectional view showing that pistons 50, 55, 60, and 65 of the bicycle caliper 1 push the brake pads 2.

When the bicycle brake lever is squeezed, the bicycle brake lever forces the oil to flow through the oil pipe, the second fluid inlet 1222b, the second radial channel 1422, and the second axial channel 1421. Then, the oil is forced to flow to the second connection opening 162 of the first fluid channel 16 via the opening 1423 and to the first connection opening 161 of the first fluid channel 16 via the second mount hole 1121, the second lateral groove 1124, and the connection channel 1125. Then, the oil enters into the first fluid channel 16 and moves the pistons 50, 55, 60, and 65 in the piston chambers 1132 and 1232, pressing the brake pads 2 against the brake disk 3.

In this embodiment, the first channel 1131 and the second channel 1231 of the first fluid channel 16 of the casing assembly 10 respectively penetrate through the piston chambers 1132 and 1232, and the two opposite openings of the second fluid channel 17 are respectively in fluid communication with the first connection opening 161 and the second connection opening 162 of the first fluid channel 16, and the second fluid channel 17 does not penetrate through the piston chambers 1132 and 1232, such that the oil flowing through the second fluid channel 17 can flow into the first fluid channel 16 from the first connection opening 161 and the second connection opening 162 of the first fluid channel 16 to force the pistons 50, 55, 60, and 65 to move. Therefore, the time differences among the pistons 50, 55, 60, and 65 that begin to move can be reduced down to an acceptable range, such that the time that the pistons 50, 55, 60, and 65 are evenly forced by the oil can be reduced, thereby improving the braking performance of the bicycle caliper 1. In other words, due to the above fluid channels arrangement, the pistons 50, 55, 60, and 65 can be activated substantially at the same time so that the time the oil needs to equally distribute force on the pistons is significantly reduced.

The sealing rings 20 and 25 can prevent the oil from leaking from the place where the first mount portion 111 and the third mount portion 121 are contact with each other. In addition, the sealing ring 35 can prevent the oil from leaking from the place where the second mount portion 112 and the fourth mount portion 122 are in contact with each other. Therefore, the sealing rings 20, 25, and 35 improve the liquid tightness of the bicycle caliper 1. Moreover, the sealing ring 30, 40, and 45 can also improve the liquid tightness of the bicycle caliper 1.

Furthermore, the flange 1321 of the first fastener 13 located between the sealing rings 20 and 25 and located at the place where the first mount portion 111 and the third mount portion 121 are contact with each other can secure the positions of the sealing rings 20 and 25, such that the sealing ring 20 is prevented from being moved towards the first through hole 1211, and the sealing ring 25 is prevented from being moved towards the first mount hole 1111, thereby ensuring the liquid tightness of the bicycle caliper 1.

The steps before filling oil into the bicycle caliper 1 includes removing the bolt 70 from the first fluid inlet 1122 and plugging an oil pipe into the second fluid inlet 1222b. When the oil is fed into the bicycle caliper 1 via the first fluid inlet 1122, the oil will push the air substances out of the bicycle caliper 1 from the second fluid inlet 1222b. That is, second fluid inlet 1222b can be served as an air outlet while feeding the oil.

In this embodiment, the first fluid inlet 1122 and the second fluid inlet 1222b are respectively located at the second mount portion 112 and the fourth mount portion 122 assembled with each other, such that the first fluid inlet 1122 and the second fluid inlet 1222b are located at the same side of the bicycle caliper 1. This arrangement allows removing the bolt 70 and plugging the oil pipe can be taken on the same side of the bicycle caliper 1, achieving a convenient oil filling process.

Note that the first fluid inlet 1122 is not restricted to be in fluid communication with the first channel 1131 via the inlet channel 1123; in some other embodiments, the second mount portion may not have the inlet channel, and the first fluid inlet may be in direct fluid communication with the first channel.

Note that the first channel 1131 is not restricted to be in fluid communication with the first lateral groove 1113 of the third channel 15 via the connection channel 1112, and the first radial channel 1323 of the third channel 15 is not restricted to be in fluid communication with the second channel 1231 via the gap G and the connection channel 1212; in some other embodiments, the first channel may be in direct fluid communication with the first lateral groove, and the first radial channel of the third channel may be in direct fluid communication with the second channel. In such a configuration, the first fluid channel may be merely formed by the first channel, the second channel, and the third channel.

Note that the quantity of the first lateral grooves is not restricted to be two; in some other embodiments, the first casing body may have more or less number of first lateral groove, or may have no first lateral groove. When the first casing body has no first lateral groove, the first channel may be in direct fluid communication with the first mount hole.

Note that the second fluid channel 17 is not restricted to include the connection channel 1125, the second lateral groove 1124, the second mount hole 1121, a part of the second axial channel 1421, the opening 1423, and the connection channel 1221b; in some other embodiments, the second fluid channel 17 may merely include the second lateral groove 1124, the second mount hole 1121, a part of the second axial channel 1421, and the opening 1423. In such a configuration, the second lateral groove and the opening may be respectively in direct fluid communication with the first connection opening and the second connection opening of the first fluid channel.

Note that the second fluid inlet 1222b is not restricted to be in fluid communication with the second connection opening 162 of the first fluid channel 16 via the second radial channel 1422, the second axial channel 1421, the opening 1423, and the connection channel 1221b; in some other embodiments, the second fluid inlet may be in direct fluid communication with the second connection opening of the first fluid channel; that is, the second radial channel 1422, the second axial channel 1421, the opening 1423 of the second fastener 14 may be omitted, and the connection channel 1221b of the casing part 1221 of the fourth mount portion 122 may be omitted. In such a configuration, the second mount portion may have no second lateral groove, and the second fluid channel may be in direct fluid communication with the first connection opening and the second connection opening of the first fluid channel.

Figure 7:
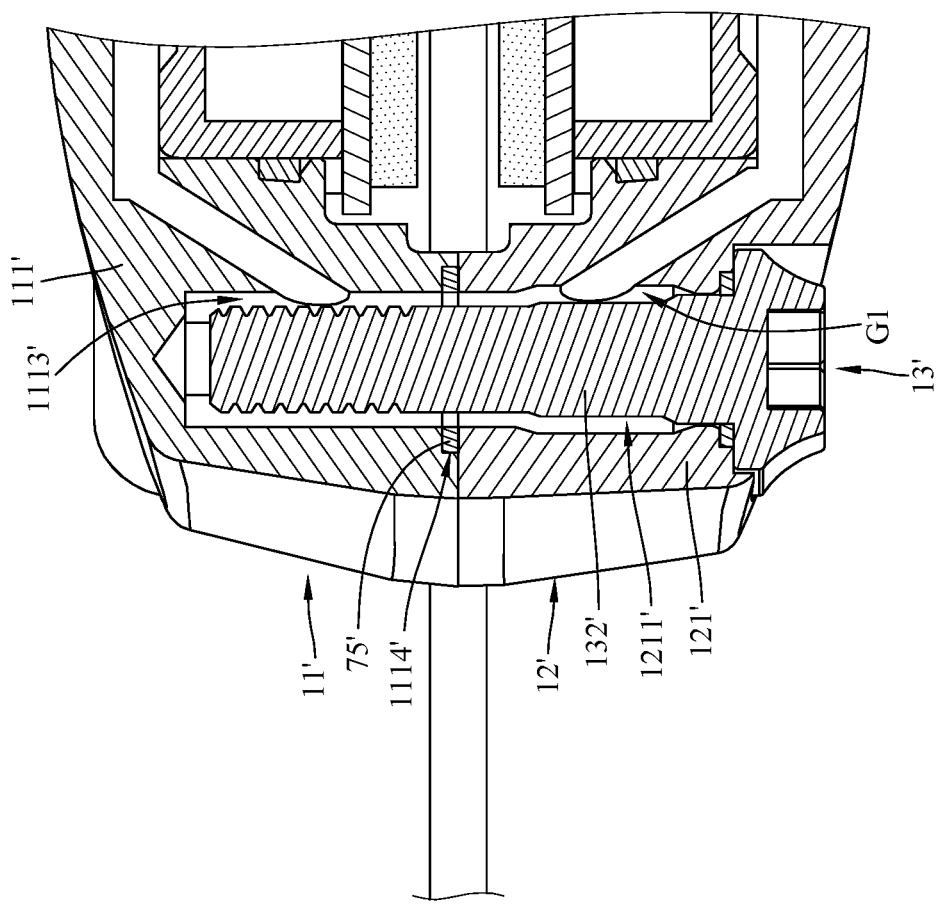
FIG. 7 is a partial and enlarged cross-sectional view of a bicycle caliper according to a second embodiment of the disclosure.

Then, referring to FIG. 7, there is shown a partial and enlarged cross-sectional view of a bicycle caliper according to a second embodiment of the disclosure.

In this embodiment, the bicycle caliper is similar to the bicycle caliper 1 shown in FIG. 3, therefore the following paragraphs will only introduce the main difference between them, and the same or similar parts will not be described hereinafter.

In this embodiment, a first fastener 13' is solid bolt; that is, a first body portion 132' of the first fastener 13' have no axial channel and radial channel. In addition, a gap G1 formed between the first body portion 132' of the first fastener 13' and an inner surface of a second casing body 12' that surrounds a first through hole 1211' of the second casing body 12' is in fluid communication with a first lateral groove 1113' of a first casing body 11'. As such, even though the first body portion 132' of the first fastener 13' has no axial channel and radial channel, oil can still flow between the first casing body 11' and the second casing body 12' via the first lateral groove 1113' and the gap G1.

In addition, a first mount portion 111' of the first casing body 11' further has a recess 1114'. The recess 1114' is formed at a surface of the first mount portion 111' facing a third mount portion 121' of the second casing body 12'. Furthermore, there is only one sealing ring 75' sleeved on the first body portion 132' of the first fastener 13'. The sealing ring 75' is disposed at the recess 1114' and located at the place where the first mount portion 111' of the first casing body 11' is in contact with the third mount portion 121' of the second casing body 12', and the sealing ring 75' is not located at the first lateral groove 1113', such that the sealing ring 75' will not interfere the flow of the oil and can ensure the fluid tightness of the bicycle caliper.

Note that the sealing ring 75' is not restricted to be merely located at the recess 1114' of the first mount portion 111'; in some other embodiments, the third mount portion of the second casing body may have a recess formed at the surface of the third mount portion facing the first mount portion, and the sealing ring is accommodated at the recesses of the first mount portion and the third mount portion.

According to the bicycle calipers as discussed above, the first channel and the second channel of the first fluid channel of the casing assembly respectively penetrate through the piston chambers and, and the second fluid channel are in fluid communication with the first connection opening and the second connection opening of the first fluid channel and does not penetrating through the piston chambers, such that the oil flowing through the second fluid channel can flow into the first fluid channel from the first connection opening and the second connection opening of the first fluid channel to force the pistons to move. Therefore, the time differences among the pistons that begin to move can be reduced down to an acceptable range, such that the time that the pistons are evenly forced by the oil can be reduced, thereby improving the braking performance of the caliper.

In addition, the sealing rings sleeved on the first body portion of the first fastener and respectively located at the first mount hole of the first casing body and the first through hole of the second casing body can prevent oil from linking from the place where the first mount portion and the third mount portion are contact with each other, thereby improving the fluid tightness of the caliper.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A bicycle caliper, comprising:
   a casing assembly, comprising a first casing body, a second casing body, a first fastener and a second fastener and having first fluid channel, a plurality of piston chambers, and a second fluid channel, wherein the first casing body has a first fluid inlet, the second casing body has a casing part, a pipe connection part and a second fluid inlet located at the pipe connection part, the first fastener is disposed through the second casing body and fixed in the first casing body, the second fastener is disposed through the pipe connection part and the casing part and fixed in the first casing body, the first fluid channel is arranged at the first casing body, the first fastener and the second casing body, the first fluid channel has a first connection opening and a second connection opening opposite to each other, the first connection opening and the second connection opening of the first fluid channel are respectively in fluid communication with the first fluid inlet and the second fluid inlet, the plurality of piston chambers are respectively located at the first casing body and the second casing body, the first fluid channel penetrates through the plurality of piston chambers, the second fluid channel is arranged at the first casing body, the second fastener and the casing part of the second casing body, two opposite openings of the second fluid channel are respectively in fluid communication with the first connection opening and the second connection opening of the first fluid channel, and the second fluid channel does not penetrate through the plurality of piston chambers;
   a plurality of pistons, respectively and movably disposed in the plurality of piston chambers; and
   a bolt, mounted into the first fluid inlet;
   wherein a central axis of the second fastener is non-parallel to a central axis of the bolt.

2. The bicycle caliper according to claim 1, wherein the first fluid channel has a first channel, a second channel, and a third channel, the first channel and the second channel are in fluid communication with the third channel and extend in the same direction, the first connection opening and the second connection opening of the first fluid channel are respectively located at an end of the first channel located away from the third channel and an end of the second channel located away from the third channel, and the first channel and the second channel respectively penetrate through the plurality of piston chambers.

3. The bicycle caliper according to claim 2, wherein the first channel, a part of the plurality of piston chambers, a part of the second fluid channel, and a part of the third channel are located at the first casing body, the other part of the third channel is located at the first fastener, and the second channel, the other part of the plurality of piston chambers, and the other part of the second fluid channel are located at the second casing body.

4. The bicycle caliper according to claim 3, wherein the first casing body has a first mount hole and at least one first lateral groove formed at an inner surface of the first casing body that surrounds the first mount hole, the second casing body has a first through hole, the first fastener is disposed through the first through hole and fixed in the first mount hole, the first fastener has a first axial channel and a first radial channel connected to each other, the first axial channel and the first radial channel respectively extend in axial and radial directions, the at least one first lateral groove, the first mount hole, the first axial channel, and the first radial channel are in fluid communication with each other so as to form the third channel.

5. The bicycle caliper according to claim 4, wherein a part of the first through hole is wider than the first fastener, such that a gap is formed between the first fastener and an inner surface of the second casing body that surrounds the first through hole, and the first radial channel is in fluid communication with the second channel via the gap.

6. The bicycle caliper according to claim 4, further comprising a sealing ring, wherein the first fastener comprises a first head portion and a first body portion connected to each other, the first axial channel and the first radial channel is located at the first body portion, the first body portion is disposed through the first through hole and fixed in the first mount hole, the first head portion is located outside the first through hole, and the sealing ring is located between and clamped by the first head portion and the second casing body.

7. The bicycle caliper according to claim 4, wherein the first casing body further has a second mount hole and at least one second lateral groove formed at an inner surface of the first casing body that surrounds the second mount hole, the casing part of the second casing body has a second through hole, the second fastener is disposed through the second through hole and fixed in the second mount hole, the second fastener has a second axial channel, an opening and a second radial channel connected to each other, the second axial channel and the second radial channel respectively extend in axial and radial directions, the at least one second lateral groove, the second mount hole, the second axial channel, and the opening of the second fastener together form the second fluid channel, the at least one second lateral groove is in fluid communication with the first connection opening, and the opening of the second fastener is in fluid communication with the second connection opening.

8. The bicycle caliper according to claim 4, wherein the first casing body comprises a first mount portion, a second mount portion, and a first piston accommodation portion located between and connected to the first mount portion and the second mount portion, the second casing body comprises a third mount portion, a fourth mount portion, and a second piston accommodation portion located between and connected to the third mount portion and the fourth mount portion, the first mount portion and the second mount portion are respectively assembled with the third mount portion and the fourth mount portion, the first fluid inlet and a part of the second fluid channel is located at the second mount portion, the first fluid channel is arranged at the first mount portion, the first piston accommodation portion, the second piston accommodation portion, and the third mount portion, the plurality of piston chambers are respectively located at the first piston accommodation portion and the second piston accommodation portion, and the second fluid inlet and the other part of the second fluid channel are located at the fourth mount portion.

9. A bicycle caliper, comprising:
   a casing assembly, comprising a first casing body, a second casing body, a first fastener and a second fastener, wherein the first casing body has a first mount hole and a first fluid inlet, the second casing body has a first through hole, a casing part, a pipe connection part and a second fluid inlet located at the pipe connection part, the first casing body are assembled with the second casing body, the first through hole is in fluid communication with the first mount hole, the first fastener comprises a first body portion, the first body portion is disposed through the first through hole and fixed in the first mount hole, the first body portion has a first axial channel, and the first axial channel is in fluid communication with the first mount hole, the second fastener is disposed through the pipe connection part and the casing part and fixed in the first casing body;

at least two sealing rings, sleeved on the first body portion and respectively located in the first mount hole and the first through hole; and a bolt, mounted into the first fluid inlet;

wherein a central axis of the second fastener passes through the bolt along a radial direction of the bolt.

10. The bicycle caliper according to claim 9, wherein the first body portion has a flange radially protruding outwards, and the flange is located between the at least two sealing rings.

11. The bicycle caliper according to claim 9, wherein the first casing body further has at least one first lateral groove formed at an inner surface of the first casing body that surrounds the first mount hole, and the at least one first lateral groove is in fluid communication with the first axial channel via the first mount hole.

12. The bicycle caliper according to claim 11, wherein the first body portion further has a first radial channel in fluid communication with the first axial channel, the first axial channel and the first radial channel respectively extend in axial and radial directions, the first casing body has a first channel in fluid communication with the first fluid inlet, the second casing body has a second channel in fluid communication with the second fluid inlet, the first channel is in fluid communication with the second channel via the at least one first lateral groove, the first mount hole, the first axial channel, and the first radial channel.

13. The bicycle caliper according to claim 12, further comprising a plurality of pistons, wherein the first casing body and the second casing body have a plurality of piston chambers, the first channel and the second channel respectively penetrate through the plurality of piston chambers, and the plurality of pistons are respectively and movably disposed in the plurality of piston chambers.

14. The bicycle caliper according to claim 12, wherein the at least one first lateral groove, the first mount hole, the first axial channel, and the first radial channel together form a third channel, the first channel and the second channel extend from the third channel in the same direction, and the first channel, the second channel, and the third channel together form a first fluid channel.

15. The bicycle caliper according to claim 14, wherein the first channel has a first connection opening located at an end of the first channel away from the third channel, the first connection opening is in fluid communication with the first fluid inlet, the second channel has a second connection opening located at an end of the second channel away from the third channel, the second connection opening is in fluid communication with the second fluid inlet, the first casing body further has a second mount hole and at least one second lateral groove formed at an inner surface of the first casing body that surrounds the second mount hole, the casing part of the second casing body has a second through hole, the second fastener is disposed through the second through hole and fixed in the second mount hole, the second fastener has a second axial channel, an opening, and a second radial channel in fluid communication with each other, the second axial channel and the second radial channel respectively extend in axial and radial directions, the at least one second lateral groove, the second mount hole, the second axial channel, and the opening of the second fastener together form a second fluid channel, and the second lateral groove is in fluid communication with the first connection opening, and the opening of the second fastener is connected to the second connection opening.

16. The bicycle caliper according to claim 12, wherein a part of the first through hole is wider than the first body portion, such that a gap is formed between the first body portion and an inner surface of the second casing body that surrounding the first through hole, and the first radial channel is in fluid communication with the second channel via the gap.

17. The bicycle caliper according to claim 9, wherein the at least two sealing rings comprises three sealing rings, the first fastener further comprises a first head portion connected to an end of the first body portion and located outside the first through hole, two of the three sealing rings are respectively located in the first mount hole and the first through hole, and the other of the three sealing rings are located between and clamped by the first head portion and the second casing body.

* * * * *